United States Patent
Karns et al.

(10) Patent No.: US 8,395,984 B2
(45) Date of Patent: *Mar. 12, 2013

(54) MULTILEVEL DATA STRUCTURE

(75) Inventors: Duane C. Karns, Pittsburgh, PA (US);
Dieter K. Weller, San Jose, CA (US);
William A. Challener, Sewickley, PA (US); Edward Gage, Mars, PA (US);
David S. Kuo, Palo Alto, CA (US); Neil Deeman, Alamo, CA (US); Shih-Fu Lee, Fremont, CA (US); Koichi Wage, Sunnyvale, CA (US)

(73) Assignee: Seagate Technology LLC

( * ) Notice: Subject to any disclaimer, the term of this patent is extended or adjusted under 35 U.S.C. 154(b) by 109 days.

This patent is subject to a terminal disclaimer.

(21) Appl. No.: 12/938,233

(22) Filed: Nov. 2, 2010

(65) Prior Publication Data
US 2011/0044147 A1 Feb. 24, 2011

Related U.S. Application Data

(63) Continuation of application No. 11/352,239, filed on Feb. 13, 2006, now Pat. No. 7,830,775.

(51) Int. Cl.
*G11B 7/00* (2006.01)
(52) U.S. Cl. ........................................................ 369/126
(58) Field of Classification Search ............... 369/275.1, 369/275.2, 275.3, 94, 126, 47.1, 44.32, 112.23; 356/477, 479
See application file for complete search history.

(56) References Cited

U.S. PATENT DOCUMENTS

2006/0114802 A1* 6/2006 Marshall et al. ............ 369/275.1
2008/0056088 A2* 3/2008 Shuy et al. .................... 369/59.1

* cited by examiner

*Primary Examiner* — Nabil Hindi

(57) ABSTRACT

A method of performing writable optical recording of a medium to form multilevel oriented nano-structures therein, comprises steps of providing a disc-shaped, writable recording medium having a planar surface; and encoding data/information in the medium by forming a plurality of multilevel nano-structured pits in the surface by scanning with a focused spot of optical energy to form at least one data track therein, including scanning the optical spot in a cross-track direction while rotating the disc about a central axis.

22 Claims, 6 Drawing Sheets

FIG. 1
Multi-States Encoding
Conventional Encoding
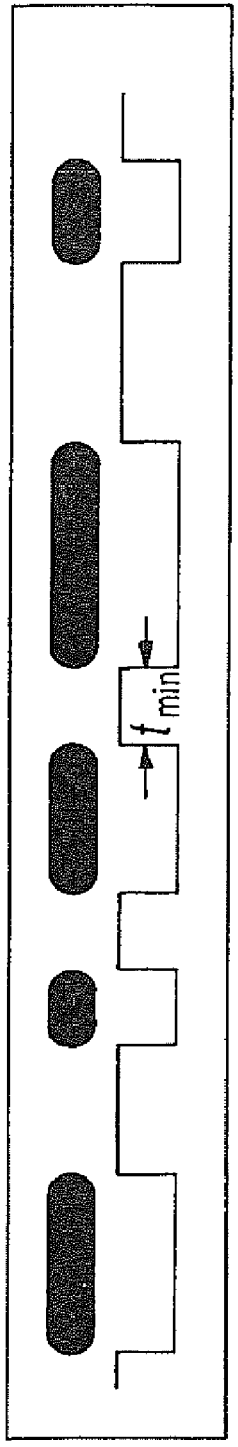
Multi-States Encoding
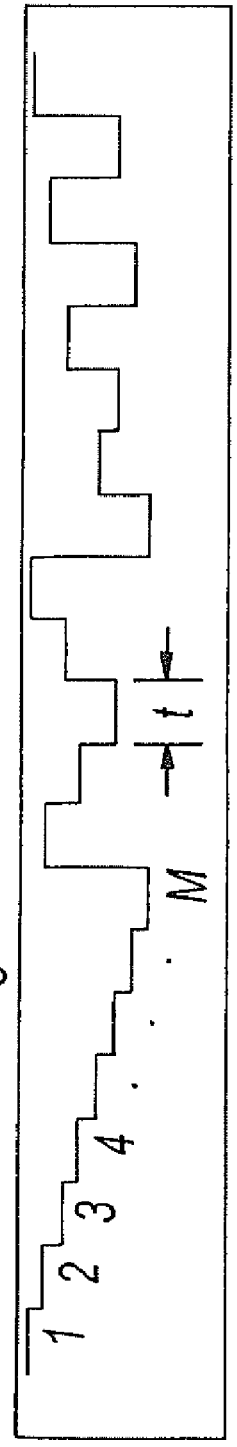
Areal density and data rate goes up by packing more information (M states) into one recording cell.

Oriented Nano-Structure (ONS) Technology

| CD | DVD | Blu-ray Disc | ONS Disc |
|---|---|---|---|
| $\lambda = 780$ nm<br>NA = 0.45<br>1.2 mm substrate | $\lambda = 650$ nm<br>NA = 0.60<br>0.6 mm substrate | $\lambda = 400$ nm<br>NA = 0.85<br>0.1 mm cover layer | $\lambda = 400$ nm<br>NA = 0.85<br>0.1 mm cover layer |
| 650 MB<br>1.6 μm | 4.7 GB<br>0.74 μm | 25 GB<br>0.3 μm | 125 GB |
| 1st generation<br>Audio<br>0.7 GB<br>1x: 1.2 Mb/s<br>$\lambda = 780$ nm<br>NA = 0.45<br>1.2 mm cover | 2nd generation<br>SD Video<br>4.7/8.5 GB<br>1x: 11 Mb/s<br>$\lambda = 650$ nm<br>NA = 0.60<br>0.6 mm cover | 3rd generation<br>HD Video<br>25/50 GB<br>1x: 36 Mb/s<br>$\lambda = 405$ nm<br>NA = 0.85<br>0.1 mm cover | 4th generation<br>HD Compact Video<br>125 GB<br>1x: 180 Mb/s<br>L = 405 nm<br>NA = 0.85 |

Enable 5x or more in storage capacity and data rate of optical discs with similar far-field optics of convention optical drive.

FIG. 2

MULTILEVEL DATA STRUCTURE

CROSS-REFERENCES TO RELATED APPLICATIONS

This application is a continuation of U.S. patent application Ser. No. 11/352,239, filed on Feb. 13, 2006, entitled "Writeable Optical Recording of Multi-Level Oriented Nano-Structure Discs," which is hereby incorporated herein by reference in its entirety.

FIELD OF THE INVENTION

The present invention relates to methodology and technology for optical writing of multilevel oriented nano-structures in the surfaces of discs utilized as optical data/information storage and retrieval media. The invention has particular utility in the formation and use of optical media with ultra-high data storage capacities in excess of about 150 Gbytes for disc diameters comparable to those of currently available CD and DVD media.

BACKGROUND OF THE INVENTION

Oriented Nano-Structure ("ONS") optical media provide storage capacities/densities which are increased by a factor as high as about 5, relative to the currently available CD, DVD, HD-DVD, etc., media. Advantageously, such ONS media and systems are backward compatible with the CD, DVD, HD-DVD technologies, and suitable for use in new markets for small form-factor discs such as are currently employed in personal audio/video devices, e.g., Game Boys®, iPODS®, etc.

Referring to FIG. 1, the upper illustration is a plan view of a data track (or recording cell) of a conventionally encoded optical medium, showing a pattern comprised of a plurality of elongated pits (dark areas) formed in the surface of the medium and the corresponding output pattern of a read head or photodetector which is produced by the pattern of pits, wherein $t_{min}$ indicates the minimum spacing between adjacent pits, which limits the maximum data encoding density and reading rate for a given disc rotation speed.

Still referring to FIG. 1, the lower illustration shows the output pattern of a read head or photodetector of a multi-states encoded medium, wherein the surface of the medium includes a data track (or recording cell) with a pattern of pits configured as multilevel oriented nano-structures. As is evident from a comparison of these illustrations, and noting that $t<t_{min}$, the areal recording density and data rate are significantly increased (i.e., $\geq 5\times$) in the multi-states encoded medium by packing more information (i.e., M states) into the recording cell, while advantageously allowing operation with far-field optics similar to those of conventional optical drives.

Adverting to FIG. 2, shown therein are cross-sectional system views and plan views of the encoded surfaces of conventional CD, DVD, Blu-Ray®, and ONS media, along with associated performance characteristics and operating parameters of these media types. As before, it is evident that ONS media offer significantly increased areal recording density and data rate vis-à-vis the earlier generations of optical media by virtue of: (1) decreased spacing between adjacent data tracks; (2) the ability to widely vary the angles of the pit walls, hence the encoding information; and (3) the increased pit density along each data track.

Currently, however, ONS technology is limited to read-only memory (ROM) devices produced via stamping techniques. ONS technology possesses the potential for becoming significantly more valuable if disc media were available in "write once" and/or "re-writable" versions. Such writable ONS discs could be expected to attain data storage capacities in the 150-1,000 Gbyte range when in a 5.25 in. diameter format and could be used equally well for content delivery (as in the current CD and DVD markets) and archival storage and retrieval applications.

Accordingly, there exists a clear need for means and methodology for means and methodology for optical writing of multilevel oriented nano-structures in the surfaces of discs utilized as optical data/information storage and retrieval media. Further, their exists a clear need for the development and use of writable optical ONS media with ultra-high data storage capacities in excess of about 150 Gbytes for disc diameters comparable to those of currently available CD and DVD media.

SUMMARY OF THE INVENTION

An advantage of the present invention is an improved method of performing writable optical recording of a medium to form multilevel oriented nano-structures therein.

Another advantage of the present invention is a writable or re-writable, disc-shaped recording medium comprising oriented nano-structures formed according to the inventive methodology.

Additional advantages and other features of the present invention will be set forth in the description which follows and in part will become apparent to those having ordinary skill in the art upon examination of the following or may be learned from the practice of the present invention. The advantages may be realized and obtained as particularly pointed out in the appended claims.

According to an aspect of the present invention, the foregoing and other advantages are achieved in part by a method of performing writable optical recording of a medium to form multilevel oriented nano-structures therein, comprising steps of:

(a) providing a disc-shaped, writable recording medium having a planar surface; and (b) encoding data/information in the medium by forming a plurality of multilevel nano-structured pits in the surface by scanning the surface with a focused spot of optical energy to form at least one data track therein, including scanning the optical spot in a cross-track direction while rotating the disc about a central axis.

In accordance with embodiments of the present invention, step (b) comprises controlling the recording angle α of the optical spot by varying either the cross-track scan velocity $v_{scan}$ of the spot or the down-track velocity of the disk $v_{disc}$, wherein the angle α of the elliptical pit major axis with respect to the circumferential track direction is given by the ellipticity "ratio" $\tan \alpha = v_{disk}/v_{scan}$.

Embodiments of the present invention include those wherein step (b) comprises controlling the angle α within an accessible range of angles α within the range 11°-170° when $v_{disk}/v_{scan}$ is in the range 10:1 to 1:10 and within the range 1°-180° when $v_{disk}/v_{scan}$ is in the range 100:1 to 1:100.

Preferably, step (b) comprises controlling the ellipticity ratio at an optimized value of 2:1, whereby movement of the optical spot for generating elliptical pits is minimized and the effects of optical aberrations are minimized.

According to certain embodiments of the present invention, step (b) comprises moving the optical spot 10 times faster in the cross-track direction $v_{scan}$ than in the down-track direction ($v_{disk}$); e.g., step (b) comprises scanning the optical spot at a cross-track scan velocity $v_{scan}$ of ~40 m/sec. and a down-track disk velocity $v_{disk}$ of ~4 m/sec., corresponding to a data rate of ~100 Mbits/sec. with a pit spacing of ~200 nm and 5 bits/pit.

Embodiments of the present invention include those wherein step (b) comprises utilizing an apparatus comprising an electro-optic scanner for performing the scanning of the optical spot. According to certain embodiments, step (b) comprises utilizing an apparatus comprising, in physical sequence, a source of an incoming beam of optical energy, a far-field objective lens, and an electro-optic scanner; whereas, according to other embodiments of the invention, step (b) comprises utilizing an apparatus comprising, in physical sequence, a source of an incoming beam of optical energy, an electro-optic scanner, and a solid immersion mirror (SIM), wherein the scanner varies the position of the incoming beam of optical energy within the SIM.

Further embodiments of the present invention include those wherein step (b) comprises adding a variable phase delay to one half of the SIM or utilizing a combination of liquid crystal displays and anamorphic lenses for varying the position of the incoming beam of optical energy within the SIM.

In accordance with still further embodiments of the present invention, step (b) comprises utilizing an apparatus comprising two separate beams of optical energy for performing the scanning of the optical spot, wherein two separate beams are focused onto the surface of the recording medium with a slight cross-track offset, the relative light intensities of the two spots are varied, and the position of the center of the resultant hot spot in the surface of the medium is moved across the track.

According to embodiments of the invention utilizing apparatus adapted for performing the above method, step (b) comprises utilizing an apparatus which supplies a pair of optical energy beams of slightly different wavelengths, and separation of the beams corresponding to a desired track offset is accomplished by a weakly dispersing prism or grating.

Additional embodiments of the present invention include those wherein step (b) comprises utilizing an apparatus wherein only the hottest part of an optical spot is utilized for recording, e.g., as when step (b) comprises utilizing an apparatus which provides three overlapping optical energy beams arranged along a common axis, the central beam being a write beam with higher intensity than either of the side beams, and the side beams are utilized for trimming the profile of the optical intensity of the central writing beam so as to form an optical energy profile wherein only a relatively small portion of the optical energy of the central beam exceeds a predetermined write threshold energy. According to such embodiments, step (b) comprises performing said beam trimming by retarding each of the two side beams by 180° with respect to the central beam so that the overlap areas form phase cancellation areas of lower optical energy intensity and only a relatively small portion of the optical energy of the central beam exceeds a preselected write threshold energy.

Embodiments for performing the above-described process include those wherein step (b) comprises utilizing an apparatus for orienting/steering two side optical energy beams with respect to a central optical energy beam to achieve a preselected optical energy profile, wherein: a beam from a source of optical energy is passed through a pair of serially positioned beam splitters for splitting off respective portions of the beam to form a central, higher intensity beam and left and right side lower intensity side beams; and the side beams then serially pass through: (1) respective phase retarders to be out of phase with respect to the central beam; (2) respective X-Y acoustic-optical beam steering devices; (3) beam splitting devices; and (4) a common focusing lens, to thereby form a desired optical energy profile in combination with the central beam on the surface of the recording medium.

Still other embodiments of the present invention include those wherein step (b) comprises utilizing an apparatus which provides a preselected shaping of the focused spot of optical energy, e.g., as when step (b) comprises utilizing an apparatus wherein a phase plate is mounted on a rotatable stage and positioned in the path of the optical energy beam for providing the preselected shaping of the focused spot of the beam, wherein one side of the plate is phase retarded by 180° with respect to the other side, or a central portion or stripe of the plate is phase retarded by 180° with respect to each of a pair of side portions.

Alternatively, step (b) comprises utilizing an apparatus including an active matrix phase retarder comprised of a plurality of electro-optical elements or segments, the electro-optical elements are generally pie-shaped or die-shaped, and a dynamic phase change is created by selectively operating various of said electro-optical elements.

Embodiments of the present invention include those wherein step (a) comprises providing a writable disc-shaped recording medium including a surface layer from about 10 to about 50 nm thick and comprised of $CoPtO_x$, where x is in the range from about 2 to about, or a layer from about 10 to about 50 nm thick and comprised of $PtO_x$, where x is in the range from about 2 to about 20.

In addition, embodiments of the present invention include those wherein step (a) comprises providing a writable or re-writable disc-shaped recording medium with at least a suitably thick surface layer comprised of a material selected from the group consisting of: phase change materials, dye polymers, eutectic metal alloys, and magneto-optical recording materials.

Another aspect of the present invention is a writable or re-writable, disc-shaped recording medium comprising oriented nano-structures formed according to the inventive methodology.

Additional advantages and features of the present invention will become readily apparent to those skilled in the art from the following detailed description, wherein only the preferred embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, wherein:

FIG. 1 is an illustration for comparing data/information encoding densities of conventional optical recording media and multi-states ONS media according to the invention;

FIG. 2 illustrates cross-sectional system views and plan views of encoded surfaces of several types of conventional optical recording media and multi-states ONS media according to the invention;

DETAILED DESCRIPTION OF THE INVENTION

Figure 3:
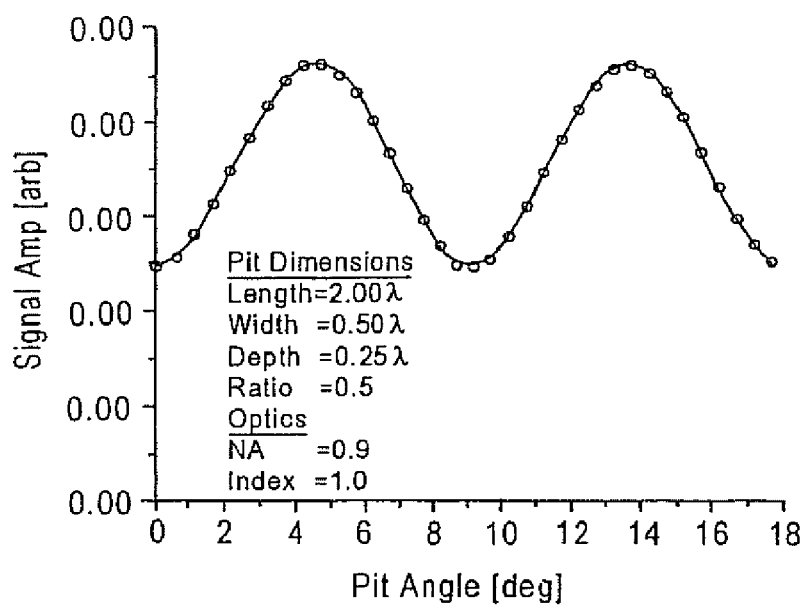
FIG. 3 is a graph of modeling results from DIFFRACT which show the effect of pit angle on read-out polarization.

Currently, read-only ONS technology operates in the following manner: A stamped pit in a read-only disk is mastered with its rotation in the plane of the disk, allowing multiple bits/spot to be stored. Polarized light is utilized for probing the pit, and the polarization state of the light is modified via interaction with the rotated pit, depending upon the rotation angle of the pit. The state of the reflected polarized light is detected by means of a suitable detection scheme, e.g., a Kerr detector. The system of disk/detector can have as many detectable rotation angle states as can be defined by the resolution of the stamper. As a consequence, the encoding scheme is no longer binary, as is the case with other currently available systems, resulting in a large gain in system capacity vis-à-vis the other systems. Optimum dimensions of the pits are considered to be approximately 2:1. FIG. 3 graphically shows modeling results from DIFFRACT (a finite difference time domain vector modeling software package) which clearly indicate the effect of pit angle on the read-out polarization, thus signal amplitude.

In contrast with the above-described "read-only" ONS technology utilizing a stamper for encoding of data/information, "write-once" ONS technology requires a recording mechanism capable of defining rotated elliptical patterns or marks along a track of the medium, i.e., substrate material that can support and maintain well-defined pits.

Figure 4:
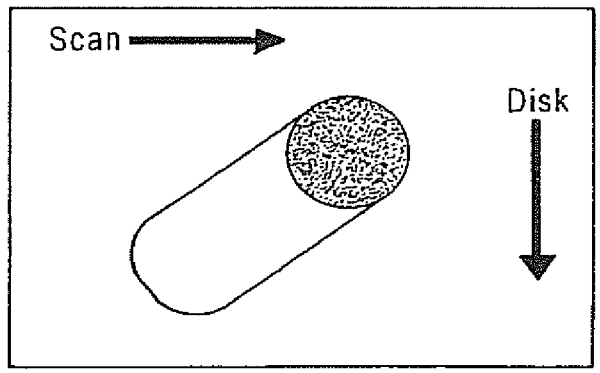
FIG. 4 is a schematic, perspective view of optical recording of disc-shaped ONS media utilizing a scanned beam of optical energy focused to a spot according to embodiments of the invention.

According to an embodiment of the present invention, optical recording of suitable disk-shaped media substrates, e.g., comprised of glass, polycarbonate, polymethylmethacrylate (PMMA) is accomplished by scanning an optical spot of sufficiently high energy density (e.g., from about 3 to about 15 mw/μm$^2$) in the cross-track direction of the disk while rotating the disk about its central axis, as schematically represented in FIG. 4. Varying either the cross-track scan velocity $v_{scan}$ or the down-track disk velocity $v_{disk}$ controls the recording angle. More specifically, the angle α of the elliptical pit major axis with respect to the circumferential track direction is given by the "ratio" tan $α=v_{disk}/v_{scan}$. Hence, the accessible range of angles α is 11°-170° for $v_{disk}/v_{scan}$ varying in the range 10:1 to 1:10 and 1°-180° when $v_{disk}/v_{scan}$ is variable in the range 100:1 to 1:100. Since the ellipticity ratio is optimized at 2:1, it is not necessary for the optical spot move very far to generate the elliptical mark, which feature is desirable from the standpoint of minimizing the effects of optical aberrations.

Scanning of the optical spot is achievable by means of an electro-optic scanner. In order to achieve the 11°-170° accessible range of angles for $v_{disk}/v_{scan}$ in the range 10:1 to 1:10, it is necessary for the optical spot to move 10 times faster in the cross-track direction ($v_{scan}$) than in the down-track direction ($v_{disk}$). Assuming, for example, a disk velocity ($v_{disk}$) of ~4 m/sec, this would require a scan velocity ($v_{scan}$) of ~40 m/sec., corresponding to a data rate of ~100 Mbits/sec. with a pit spacing of ~200 nm and 5 bits/pit.

Currently available electro-optic scanners with the requisite scan velocity contemplated for use in the present invention operate with scan rates of several tens of GHz and utilize materials that have an index of refraction which changes upon application of an electrical voltage. As a consequence of the controllably variable refractive index, the angle of light traversing the material is controllably variable. According to the invention, this feature can be combined with far field optics, a solid immersion lens or mirror, or a solid immersion lens or mirror with an optical transducer positioned at the focus.

Figures 5A, 5B:
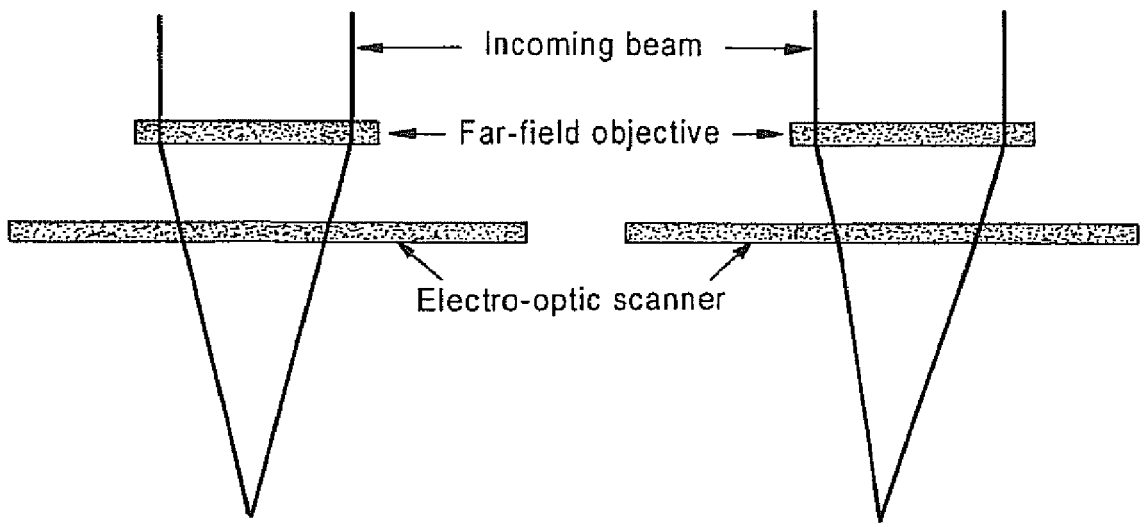
FIGS. 5 (A)-5 (B) schematically illustrate beam scanning according to an embodiment of the present invention, wherein a far field objective lens and electro-optic scanner are serially positioned in the path of an incoming beam of optical energy.
Figures 6A, 6B:
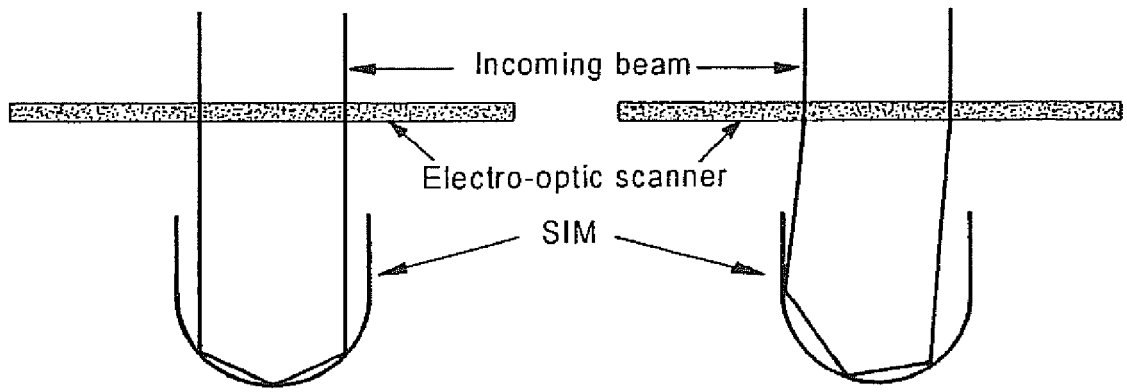
FIGS. 6 (A)-6 (B) schematically illustrate an embodiment according to the invention, wherein scanning of an incoming beam of optical energy is accomplished by means of an electro-optic scanner positioned above a solid immersion mirror (SIM), and the scanner varies the position of the incoming beam within the mirror.

FIGS. 5 (A)-5 (B) schematically illustrate beam scanning according to an embodiment of the present invention, where a far field objective lens and electro-optic scanner are serially positioned in the path of an incoming optical energy beam (e.g., from a suitable laser source); whereas FIGS. 6 (A)-6 (B) schematically illustrate another embodiment according to the invention, wherein scanning of an incoming optical energy beam (e.g., from a suitable laser source) is accomplished by means of an electro-optic scanner positioned above a solid immersion mirror (SIM), wherein the scanner varies the position of the incoming beam within the mirror.

Figure 7:
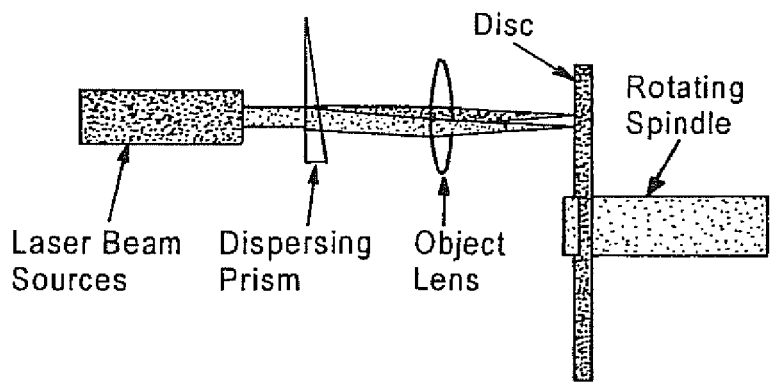
FIG. 7 schematically illustrates an embodiment of the invention utilizing a pair of optical energy beam sources of slightly different wavelengths, wherein separation of the beams corresponding to a desired data track offset is accomplished by means of a weakly dispersing prism or grating.

According to yet other embodiments of the present invention, a variable phase delay is added to one half of the SIM or a combination of liquid crystal displays and anamorphic lenses are utilized; or two separate laser beams are focused onto the recording medium with a slight cross-track offset. By varying the relative light intensities of the two spots, the position of the center of the resultant hot spot in the surface of the medium is varied across the track. As schematically illustrated in FIG. 7, if the lasers supply light beams of slightly different wavelengths, separation of the beams corresponding to the desired track offset is readily accomplished by means of a weakly dispersing prism or grating rather than by physical displacement of the laser beams with respect to each other.

Figure 8A:
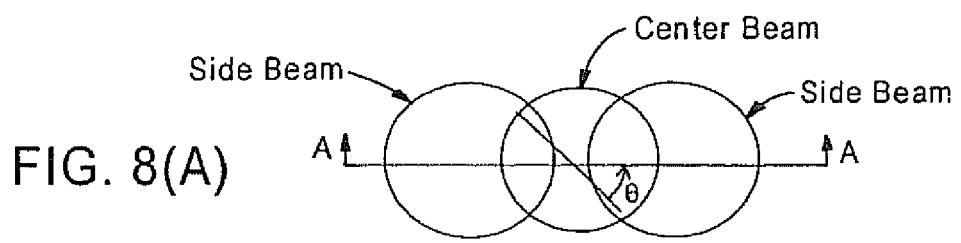
FIGS. 8 (A)-8 (B) schematically illustrate the principles of Gaussian Tip recording of ONS optical media according to an embodiment of the invention, wherein only the most energetic portion of a central optical energy beam is utilized for recording.
Figure 8B:
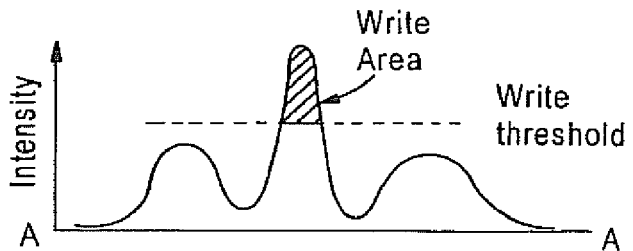

Referring to FIG. 8, schematically illustrated therein is an embodiment of an optical scanning scheme according to the present invention, which is adapted for performing the "Gaussian tip" recording wherein only the hottest part of an optical spot is utilized for recording. More specifically, FIG. 8 (A) shows three overlapping light beams arranged along a common axis, wherein the central beam is a write beam with higher intensity than that of either of the side beams. The oriented side beams are utilized for trimming the profile of the optical intensity of the central writing beam so as to form an optical energy profile wherein only a relatively small portion of the optical energy of the central beam exceeds a predetermined write threshold energy. One technique for performing such beam trimming is to retard each of the two side beams by 180° with respect to the central beam such that the overlap areas form phase cancellation areas of lower optical energy intensity. As is indicated in FIG. 8 (B), only a relatively small portion of the optical energy of the central beam, as indicated by the hatched region designated as the "Write Area" in the figure, exceeds the "Write Threshold" energy designated by the dashed line in the figure.

Figure 9:
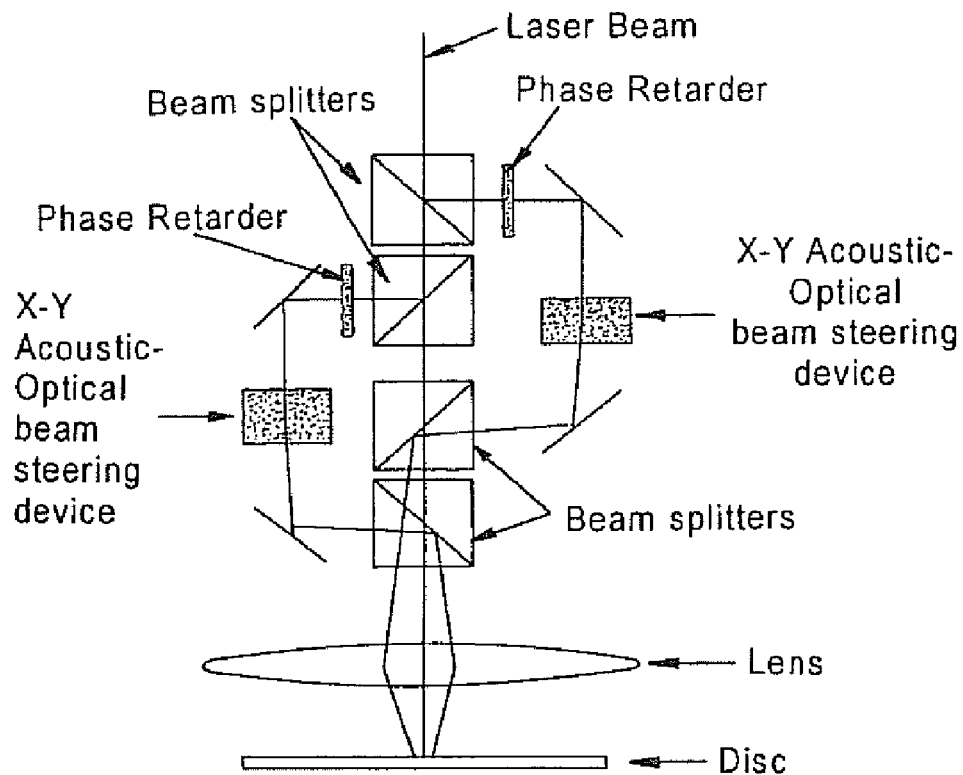
FIG. 9 illustrates, in schematic cross-sectional view, an optical apparatus/layout according to an embodiment of the invention for orienting/steering two side beams with respect to a central beam in order to achieve an optical energy profile such as shown in FIG. 8 (B)

FIG. 9 illustrates, in schematic cross-sectional view, an optical apparatus/layout according to an embodiment of the invention for orienting/steering two side beams with respect to a central beam in order to achieve an optical energy profile such as shown in FIG. 8 (B). As illustrated, a beam from a laser source passes through a pair of serially positioned beam splitters, wherein respective portions of the beam are split off therefrom to form a central, higher intensity beam and a pair of lower intensity side beams (i.e., left and right side beams). Each of the side beams then passes, via suitable mirrors, through: (1) a respective phase retarder so as to be out of phase by, e.g., 180°, with respect to the central beam; (2) a respective X-Y acoustic-optical beam steering device; (3) beam splitting devices; (4) and a common focusing lens to form a desired optical energy profile in combination with the central, higher intensity beam (such as that shown in FIG. 8 (B)) on the surface of the media substrate.

Figure 10A:
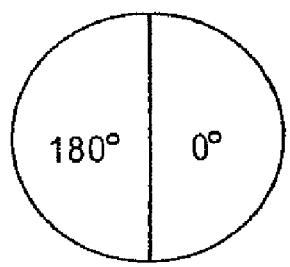
FIGS. 10 (A)-10 (B) illustrate, in simplified schematic plan views, a pair of phase plate designs adapted for use according to embodiments of the invention.
Figure 10B:
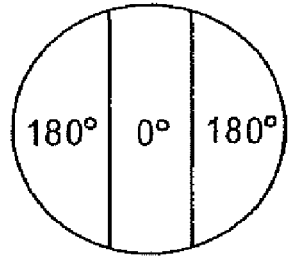

If desired or necessary, a phase plate can be placed in the optical path of the laser beam to effect a preselected shaping of the focus spot of the beam. Various phase plate designs with non-axial symmetry may be utilized for such purpose. For example, FIGS. 10 (A)-10 (B) illustrate, in simplified schematic plan view, two possible phase plate designs. According to a first design shown in FIG. 10 (A), one side of the plate is phase retarded by 180° with respect to the other side; whereas, according to a second design shown in FIG. 10 (B), a central portion (stripe) of the plate is phase retarded by 180° with respect to each of the side portions. In either instance, the phase retarder plate is mounted on a rotatable stage for use according to the invention.

Figure 11A:
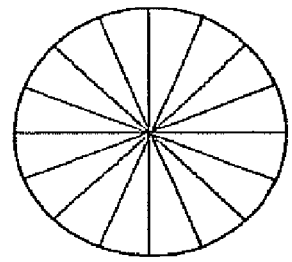
FIGS. 11 (A)-11 (B) illustrate, in simplified schematic plan views, a pair of designs for embodiments of active (i.e., variable) matrix phase retarders for use according to the invention and comprised of a plurality of electro-optical elements or segments such as liquid crystals.
Figure 11B:
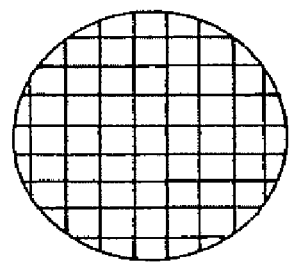

FIGS. 11 (A)-11 (B) illustrate, in simplified schematic plan views, a pair of designs for embodiments of active (i.e., variable) matrix phase retarders for use according to the invention, which comprise a plurality of electro-optical elements or segments such as liquid crystals. The electro-optical elements are generally pie-shaped in the embodiment shown in FIG. 11 (A) and die-shaped in the embodiment shown in FIG. 11 (B). In either arrangement, a dynamic phase change can be readily created by selectively operating (i.e., turning on and off) the various elements.

Figure 12:
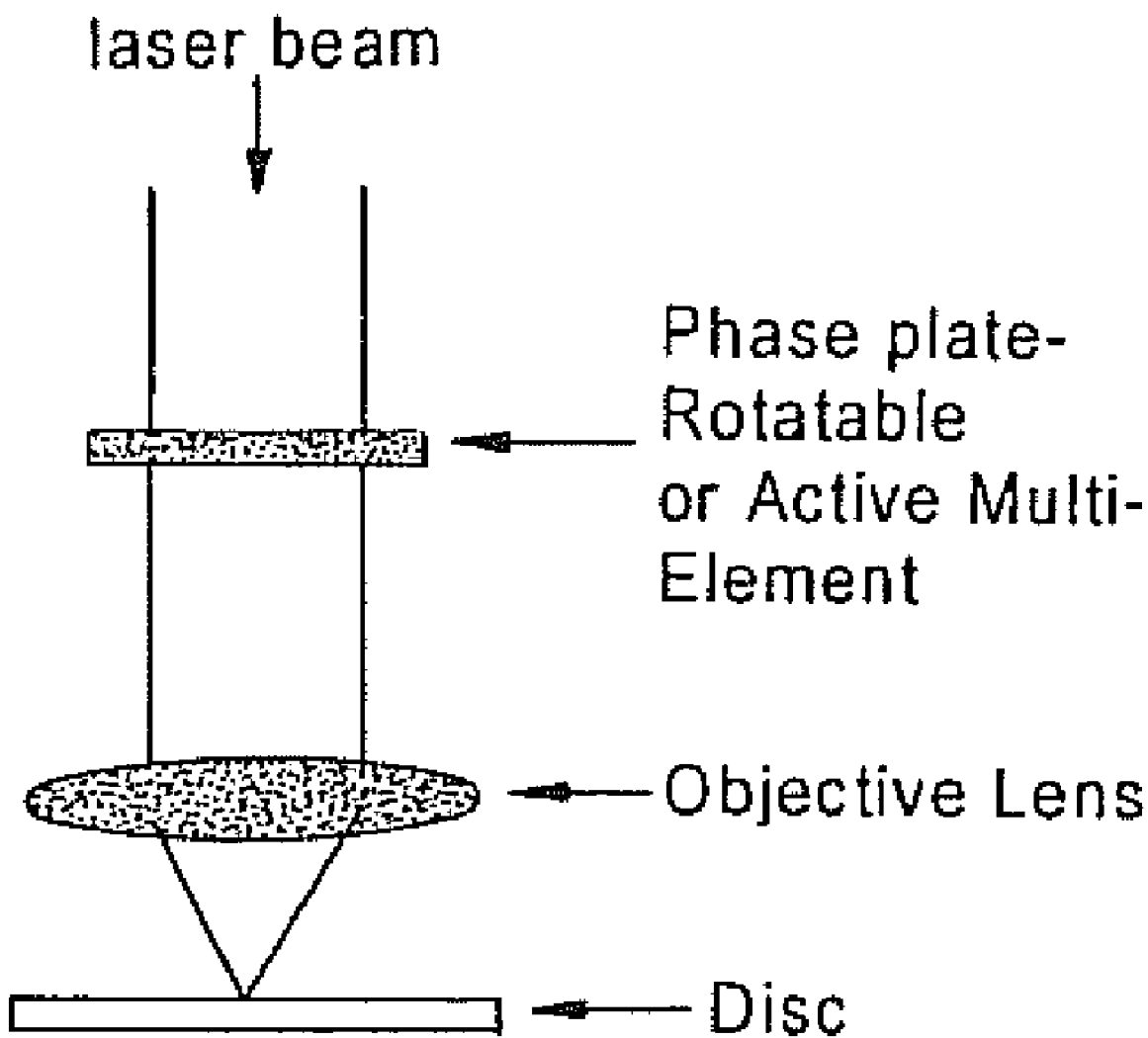
FIG. 12 illustrates, in simplified schematic view, passage of an optical energy beam through a phase plate prior to focusing of the beam by means of a lens, according to embodiments of the present invention.

FIG. 12 schematically illustrates passage of the laser beam through the phase plate prior to focusing by a suitable lens. If a fixed phase retarder is utilized, such as of the type shown in FIGS. 10 (A)-10 (B), a rotational stage can be employed, as indicated above, for rotating the phase retarder plate for orienting the shaped and focused spot. On the other hand, if an active (variable) phase retarder is utilized, such as of the type shown in FIGS. 11 (A)-11 (B), the orientation of the shaped and focused beam can be adjusted by turning selected electro-optical elements on and off as desired. In either instance, the resulting oriented, elongated focus spots can be utilized with materials of various energy thresholds for creating nanostructured media.

According to the invention, it is necessary that the recording medium produce well-defined, angularly oriented pits upon irradiation with the scanned light beam. This is accomplished, according to preferred embodiments of the invention, by utilizing a media substrate with a surface layer from about 10 to about 50 nm thick and comprised of $CoPtO_x$, where x is in the range from about 2 to about 20. Such $CoPtO_x$ surface layers have been demonstrated to produce very well-defined trenches via ablation processing which have very sharp, vertical, and smooth sidewalls.

Another material suitable for use as a writable surface layer material according to the invention is a layer of $PtO_x$ from about 10 to about 50 nm thick, wherein x is in the range from about 2 to about 20. Such $PtO_x$ material supports formation of extremely small data marks due to its high non-linear thermal response via decomposition, which feature facilitates the above-described "Gaussian tip" recording, where only the hottest part of the optical spot is utilized for recording.

A number of other recordable and re-writable materials are usable with the inventive methodology, including phase change materials such as GeSbTe, AgInSbTe, dye polymers, and eutectic metal alloys. Magneto-optical (MO) recording media are also considered suitable for use in forming re-writable ONS media via encoding processing according to the principles of the inventive methodology, in combination with an applied magnetic field.

A digital read-back signal corresponding to the encoded data/information can be obtained by scanning a laser beam over the media surface while pulsing the laser on and off; whereas an analog read-back signal can be obtained by scanning with a continuous laser beam. The read-out signal is based upon a quadrature polarization scheme, or alternatively, the focused spot from the laser beam is continuously scanned back-and-forth at high speed as the data track moves beneath the beam lens to generate a time-dependent signal that reproduces the originally recorded marks. Such readback scheme, however, requires ability to scan at a higher rate than during recording.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. An apparatus, comprising:
    scanning components adapted to scan an optical spot in a cross-track direction across a recording medium to encode multilevel data structures therein while said recording medium is rotated about a central axis; and
    recording angle controlling components coupled to said scanning components adapted to control a recording angle of said optical spot, wherein said recording angle controlling components control said recording angle by varying one of a cross-track scan velocity of said optical spot and a down-track velocity of said recording medium.

2. The apparatus of claim 1, wherein said scanning components comprise an electro-optic scanner.

3. The apparatus of claim 1, wherein said scanning components vary a position of said incoming beam of optical energy within an SIM.

4. The apparatus of claim 3, wherein said recording angle controlling components one of add a variable phase delay to one half of said SIM and utilize a combination of liquid crystal displays and anamorphic lenses for varying said position of said incoming beam within said SIM.

5. The apparatus of claim 1, wherein said recording angle controlling components focus two separate beams onto said surface of said recording medium to have a cross-track offset.

6. An optical recording apparatus, comprising:
scanning components adapted to scan an optical spot in a cross-track direction across a recording medium to encode multilevel data structures therein, wherein said scanning components vary a position of an incoming beam of optical energy within a solid immersion mirror (SIM);
recording angle controlling components coupled to said scanning components adapted to control a recording angle of said optical spot; and
recording medium controlling components operable to rotate said recording medium about a central axis during said scan.

7. The apparatus of claim 6, wherein said recording medium controlling components comprise a spindle.

8. The apparatus of claim 6, wherein said scanning components comprise an electro-optic scanner.

9. The apparatus of claim 6, wherein said recording angle controlling components control said recording angle by varying one of a cross-track scan velocity of said optical spot and a down-track velocity of said recording medium.

10. The apparatus of claim 6, wherein said recording angle controlling components one of add a variable phase delay to one half of said SIM and utilize a combination of liquid crystal displays and anamorphic lenses for varying said position of said incoming beam within said SIM.

11. A non-transitory computer-readable medium having stored thereon computer-executable instructions that if executed by a device cause the device to perform a method, said method comprising:
scanning an optical spot in a cross-track direction across a storage medium to encode multilevel data structures therein while rotating said storage medium about a central axis; and
controlling a recording angle of said optical spot, wherein said controlling said recording angle comprises varying one of a cross-track scan velocity of said optical spot and a down-track velocity of said medium.

12. The computer-readable medium of claim 11, wherein said controlling said recording angle comprises controlling said recording angle to a range of 11° to 170° when a ratio of a down-track velocity to a cross-track scan velocity is in a range of 10:1 to 1:10 and to a range of 1° to 180° when said ratio is in a range of 100:1 to 1:100.

13. The computer-readable medium of claim 12, wherein said controlling said recording angle comprises controlling said ratio to a value of 2:1.

14. The computer-readable medium of claim 11, wherein said storage medium comprises a writable, disk-shaped, recording medium that includes a surface layer that is about 10 to about 50 nm thick and comprises $CoPtO_x$, where x is in a range of about 2 to about 20.

15. The computer-readable medium of claim 11, wherein said storage medium comprises a writable, disk-shaped, recording medium that includes a surface layer that is about 10 to about 50 nm thick and comprises $PtO_x$, where x is in a range of 2 to about 20.

16. The computer-readable medium of claim 11, wherein said storage medium comprises one of a writable and a re-writable disk-shaped recording medium with at least a surface layer comprising a material selected from a group consisting of phase change materials, dye polymers, eutectic metal alloys, and magneto-optical recording materials.

17. A method, comprising:
scanning an optical spot in a cross-track direction across a recording medium to encode multilevel data structures therein while rotating said recording medium about a central axis; and
controlling a recording angle of said optical spot, wherein said controlling said recording angle comprises focusing two separate beams onto said surface of said recording medium to have a cross-track offset.

18. The method of claim 17, wherein said controlling said recording angle comprises varying one of a cross-track scan velocity of said optical spot and a down-track velocity of said recording medium.

19. The method of claim 17, wherein said controlling said recording angle comprises controlling said recording angle to a range of 11° to 170° when the ratio of a down-track velocity to a cross-track scan velocity is in a range of 10:1 to 1:10 and to a range of 1° to 180° when said ratio is in a range of 100:1 to 1:100.

20. The method of claim 19, wherein said controlling said recording angle comprises controlling said ratio to a value of 2:1.

21. The method of claim 17, wherein said controlling said recording angle comprises moving said optical spot faster in said cross-track direction than in said down-track direction.

22. The method of claim 17, wherein said controlling said recording angle comprises scanning said optical spot at a cross-track scan velocity of ~40 m/sec, and a down-track disk velocity of 4~m/sec.

* * * * *